(No Model.)
F. K. CLARKSON.
Steam Kettle.
No. 241,301. Patented May 10, 1881.
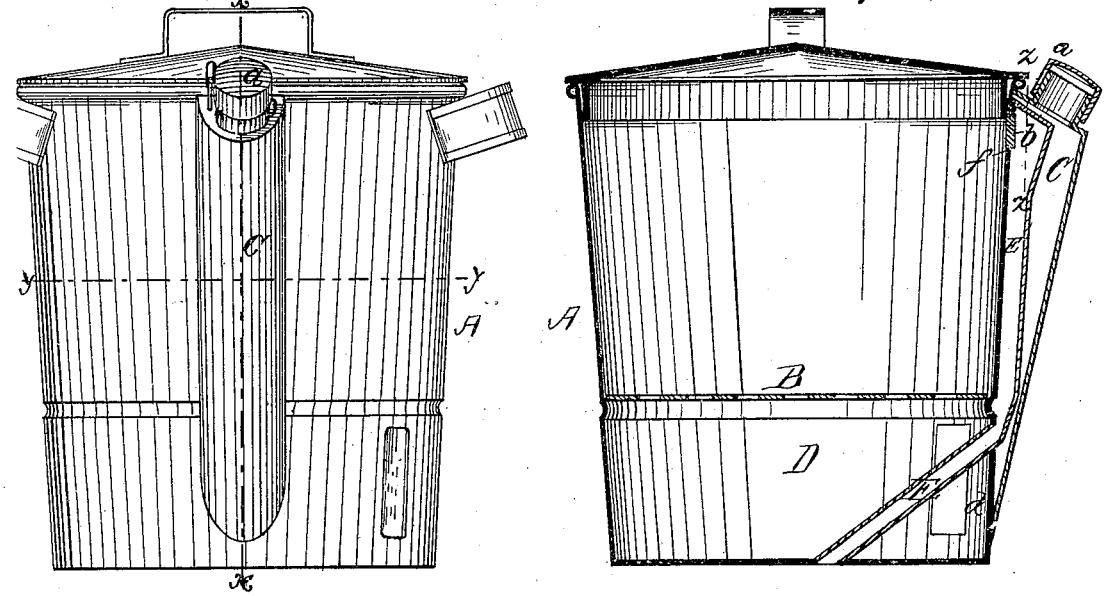
Fig.1. Fig.2.
Fig.3.
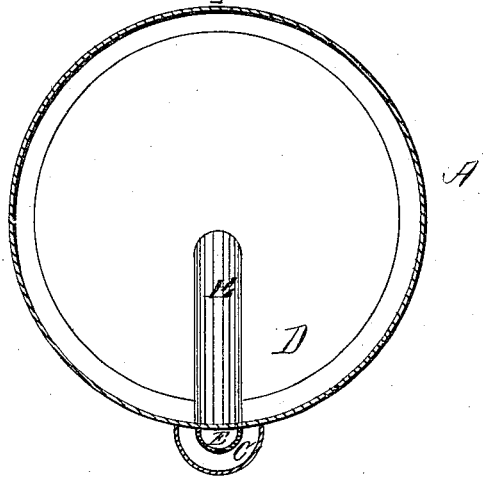
Fig.4.
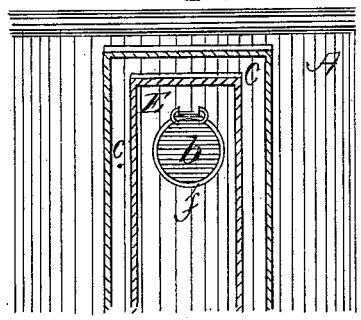
Witnesses:
Wm T. Bellows
J. A. Rutherford
F. K. Clarkson,
Inventor.
Per Brown Bros.
Attys.
N. PETERS, Photo-Lithographer, Washington, D. C.

UNITED STATES PATENT OFFICE.

FRANCIS K. CLARKSON, OF WEST MEDFORD, ASSIGNOR OF ONE-HALF TO EDWARD H. CLARK, OF BOSTON, MASSACHUSETTS.

STEAM-KETTLE.

SPECIFICATION forming part of Letters Patent No. 241,301, dated May 10, 1881.

Application filed March 9, 1881. (No model.)

*To all whom it may concern:*

Be it known that I, FRANCIS K. CLARKSON, of West Medford, in the county of Middlesex and State of Massachusetts, have invented certain new and useful Improvements in Steam-Kettles, of which the following is a full, clear, and exact description.

This invention relates to that class of steam-kettles constructed for the passage of the steam from the interior of the kettle to and into the combustion-chamber of the stove or other heating apparatus, and for the kettle to be supplied with water from time to time, as may be desired, without removing the cover.

The invention consists, first, of a steam-kettle which has two passages, the one arranged for the passage of steam from the vessel to and into the fire-chamber of the stove or other heating apparatus in connection with which the kettle is used, and the other arranged for the supply of the kettle with water from time to time, as the same is evaporated, without removing the cover of the kettle, and the two combined together and applied to and connected with the kettle so that the one shall be within and inclosed by the other.

In the drawings, Figure 1 is a view, in elevation, of my improved kettle; Fig. 2, a central vertical section on line $x\,x$, Fig. 1; Fig. 3, a horizontal section on line $y\,y$, Fig. 1; Fig. 4, an enlarged sectional view, in detail, on line $z\,z$, Fig. 2.

In the drawings, A represents the body of the kettle, made of any suitable material and any convenient form, and provided with a perforated false bottom, B, located at a short distance above the bottom thereof.

C is a tube or passage upon the outside of the kettle and extending downward therein, and entering the chamber D of the kettle near the bottom thereof. This tube C opens at its lower end, as at $d$, to the kettle-chamber, and at its upper end it is provided with a removable cap, $a$, and it is for supplying water to the kettle-chamber from time to time, as may be desired or necessary, without removing the lid from the kettle.

E is a tube or passage inside of the water-supply tube C. This tube is closed to the water-supply tube C; but at its upper end it opens to the chamber of the kettle, and at its lower end it opens to the under side and outside of the bottom of the kettle, and when the kettle is upon and over an open pot-hole of a stove, range, &c., to the fire-chamber thereof. This tube is for the passage of steam and other vapors from the inside of the kettle, when articles are being cooked therein, to the fire-chamber of the stove, &c., and it is provided with a hinged clapper-valve, $b$, arranged to swing in the opening $f$ to the passage of steam from the kettle-chamber. This valve opens and closes automatically, and by adjusting its weight the pressure of steam upon which it will open may be regulated at pleasure. This weight is adjusted to secure and maintain a sufficient pressure of steam in the kettle to produce the desired cooking action of the steam upon the food, while at the same time it escapes at the proper time and before condensation is allowed.

In the use of this improved kettle with the perforated bottom, the food to be cooked is placed upon such bottom, and the kettle below it is filled with water, and as such water is evaporated it is supplied from time to time, as desired, with water through the water-supply tube.

Although the valve $b$ swings in the opening $f$, as described, it can be arranged to fully cover the opening $f$ from the outside, if so desired.

I am aware that a steam cooking-vessel has been provided with an inclined tube passing through a hole in the side of the vessel to near the bottom thereof, and containing a float attached to a stem for indicating the depth of the water in the vessel, the latter being also provided with another tube, communicating at its upper end with the interior of the vessel, and extending down the outside thereof, all in such manner that when the vessel is arranged in the pot-hole of a stove the steam and odors of cooking can escape from the vessel into the fire-place; but such structure does not constitute my invention, and is not claimed by me.

Having thus fully described my invention, what I claim, and desire to secure by Letters Patent, is—

A steam-kettle provided with steam and water passages E C, arranged the one within the other, and adapted to communicate with the kettle-chamber D and the outside of the same, all substantially as described, for the purpose specified.

In testimony whereof I have hereunto set my hand in the presence of two subscribing witnesses.

FRANCIS K. CLARKSON.

Witnesses:
    NATHAN A. TAYLOR,
    WM. SEARS BELLOWS.